United States Patent
Suzui et al.

(10) Patent No.: US 6,927,955 B2
(45) Date of Patent: Aug. 9, 2005

(54) APPARATUS AND METHOD OF DETECTING GROUND FAULT IN POWER CONVERSION SYSTEM

(75) Inventors: Masaki Suzui, Kyoto (JP); Nobuyoshi Takehara, Kyoto (JP); Seiji Kurokami, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 10/252,569

(22) Filed: Sep. 24, 2002

(65) Prior Publication Data

US 2003/0067723 A1 Apr. 10, 2003

(30) Foreign Application Priority Data

Sep. 26, 2001 (JP) .......................................... 2001-295125

(51) Int. Cl.[7] .............................................. H02H 9/08
(52) U.S. Cl. ........................................................ 361/42
(58) Field of Search .............................. 361/42; 363/56; 323/299; 136/244

(56) References Cited

U.S. PATENT DOCUMENTS

| | | | | |
|---|---|---|---|---|
| 5,268,832 A | * | 12/1993 | Kandatsu | 363/95 |
| 5,548,504 A | | 8/1996 | Takehara | 363/65 |
| 5,592,074 A | | 1/1997 | Takehara | 363/131 |
| 5,621,300 A | | 4/1997 | Sato et al. | 320/5 |
| 5,669,987 A | | 9/1997 | Takehara et al. | 136/244 |
| 5,714,869 A | | 2/1998 | Tamechika et al. | 320/30 |
| 5,751,133 A | | 5/1998 | Sato et al. | 320/13 |
| 5,869,956 A | | 2/1999 | Nagao et al. | 323/299 |
| 5,892,354 A | | 4/1999 | Nagao et al. | 323/299 |
| 5,923,158 A | | 7/1999 | Kurokami et al. | 323/299 |
| 5,955,885 A | | 9/1999 | Kurokami et al. | 324/426 |
| 5,986,354 A | | 11/1999 | Nagao et al. | 307/64 |
| 6,101,073 A | | 8/2000 | Takehara | 361/42 |
| 6,278,052 B1 | | 8/2001 | Takehara et al. | 136/244 |
| 6,320,769 B2 | | 11/2001 | Kurokami et al. | 363/56.03 |
| 6,611,441 B2 | * | 8/2003 | Kurokami et al. | 363/56.02 |
| 6,781,802 B2 | * | 8/2004 | Kato et al. | 361/22 |
| 6,801,442 B2 | * | 10/2004 | Suzui et al. | 363/55 |

FOREIGN PATENT DOCUMENTS

| | | |
|---|---|---|
| EP | 1 104 070 A2 | 5/2001 |
| JP | 63-049455 | 10/1988 |
| JP | 6-019406 | 3/1994 |
| JP | 11-136852 A | 5/1999 |

* cited by examiner

Primary Examiner—Brian Sircus
Assistant Examiner—Boris Benenson
(74) Attorney, Agent, or Firm—Fitzpatrick, Cella, Harper & Scinto.

(57) ABSTRACT

In a power conversion system having a DC power supply which has an almost fixed DC voltage to ground and a predetermined stray capacitance to ground and outputs a DC power, and a power converter which converts the DC power output from the DC power supply into an AC power by switching, the phase of an AC voltage to ground generated in the DC power supply by switching is detected, the phase of an AC ground fault current that flows through the stray capacitance to ground and the ground fault resistance of the DC power supply is detected, and the difference between the two detected phases is compared with a predetermined threshold value, thereby determining a DC ground fault in the DC power supply. With this arrangement, the ground fault state of the DC power supply can more accurately be detected. In addition, the operation efficiency of the power conversion system can be increased.

14 Claims, 12 Drawing Sheets

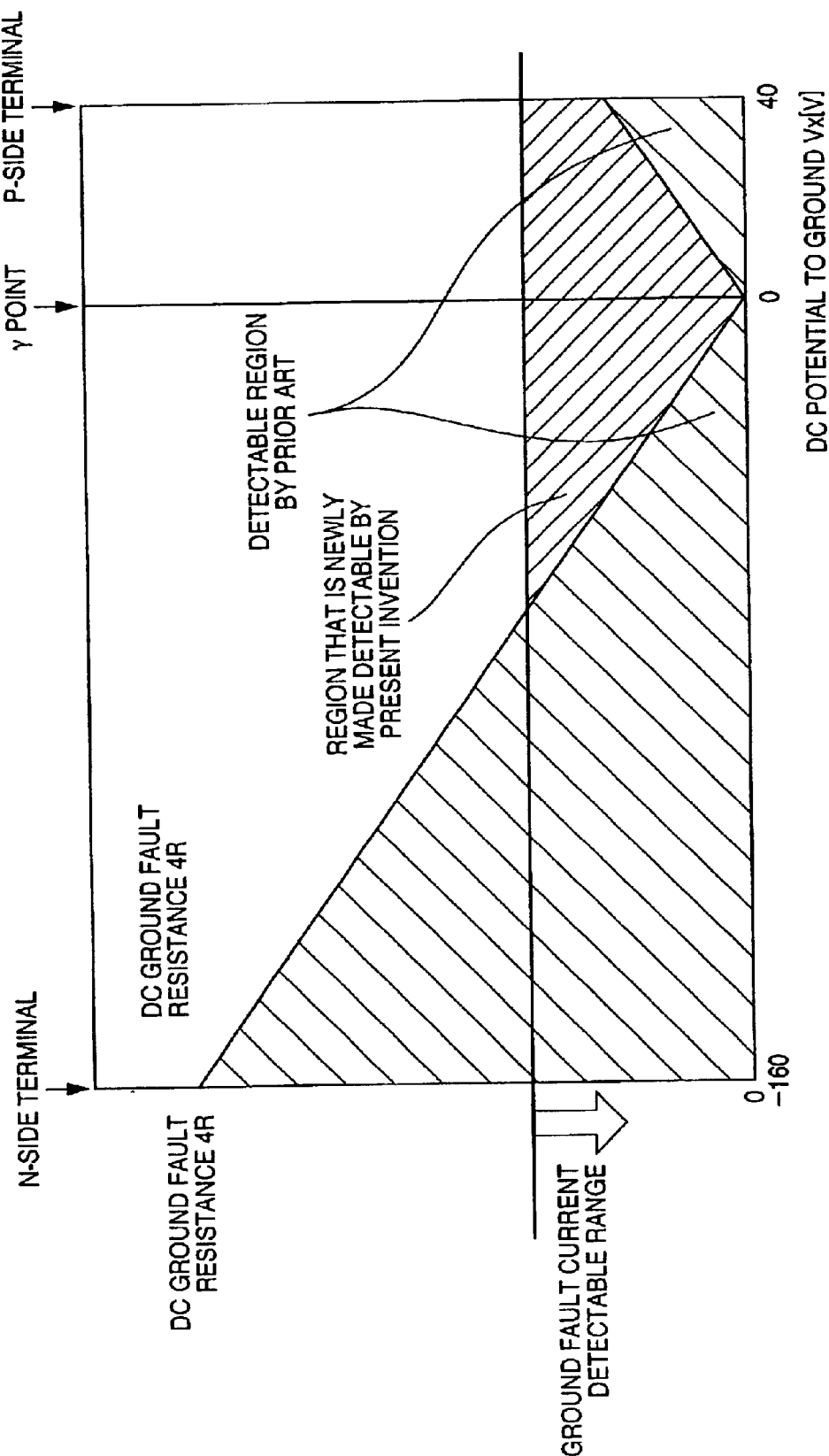

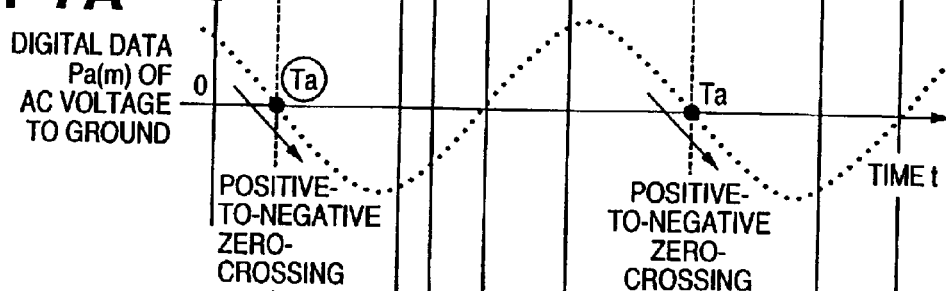
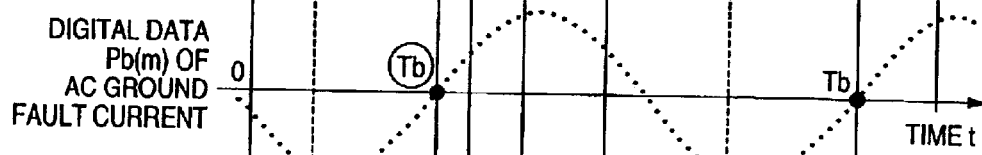
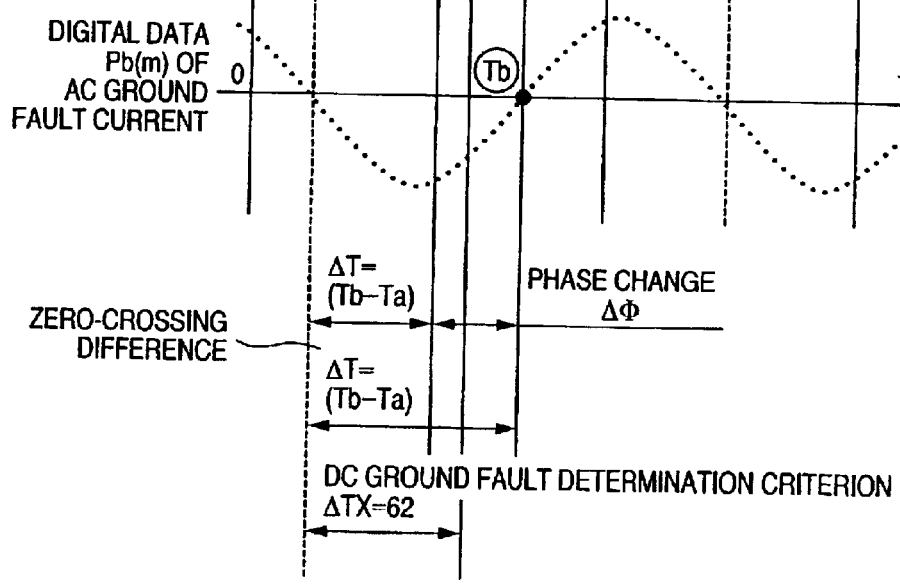

APPARATUS AND METHOD OF DETECTING GROUND FAULT IN POWER CONVERSION SYSTEM

FIELD OF THE INVENTION

The present invention relates to an apparatus and method of detecting a ground fault in a power conversion system and, more particularly, to an apparatus and method of detecting a ground fault state of a DC power supply in a power conversion system which converts a DC power generated by the DC power supply such as a solar battery into an AC power by an inverter.

BACKGROUND OF THE INVENTION

In recent years, since problems of global warming due to carbon dioxide emission by use of fossil fuel and radioactive contamination by nuclear power plant accidents and radioactive waste have become serious, interests in global environment and energy are growing. Under these circumstances, solar power generation that uses solar light as an inexhaustible and clean energy source, geothermal power generation using the geothermal energy, wind power generation using the wind power, and the like have been put into practice all over the world.

Solar power generation apparatuses using solar batteries employ various forms corresponding to output scales ranging from several W to several thousand kW. A representative system using a solar battery is a solar power generation system which converts (DC/AC-converts) a DC power generated by a solar battery into an AC power by an inverter or the like and supplies the AC power to a commercial power system.

Such a solar power generation system has a means for detecting a DC ground fault (resistance ground fault) of a solar battery to prevent any outflow of a current (to be referred to as a DC ground fault current hereinafter) due to the DC ground fault.

FIG. 9A is a view showing an example of DC ground fault detection in a solar power generation system using a transformer inverter as a system interconnection inverter. FIG. 9B shows an example of DC ground fault detection in a solar power generation system using a transformerless inverter as a system interconnection inverter.

In the example shown in FIG. 9A, a commercial power system 3 having one terminal grounded and the outputs of a system interconnection inverter (to be also simply referred to as an inverter hereinafter) 2' are insulated from each other by a transformer in the inverter 2'. A voltage detector is connected between ground (earth) and a midpoint α between voltage-dividing resistors X1 and X2 connected in parallel to a solar battery 1. For example, when a DC ground fault occurs at a point β in the solar battery 1, the potential difference between ground and the voltage dividing point α is detected by the voltage detector, thereby detecting the DC ground fault.

As in the example shown in FIG. 9B, when the inverter 2 is a transformerless inverter, a DC ground fault current in a DC circuit causes unbalance in the DC circuit and AC circuit. With an emphasis on this fact, a DC ground fault current is detected on the basis of a zero-phase current in the DC circuit or AC circuit. This method is disclosed in, e.g., Japanese Patent Laid-Open No. Hei 11-136852.

As another method generally used, a DC ground fault is detected by measuring the insulation resistance of a solar battery using an insulation resistance tester.

However, the above conventional ground fault detection methods have the following problems.

A DC power supply in a power conversion system which converts a DC power from a DC power supply such as a solar battery into an AC power sometimes has a point where the DC voltage to ground (to be referred to as a DC voltage to ground hereinafter) becomes zero or almost zero. When a DC ground fault occurs near this point, the DC ground fault current is weak. Hence, the above method of detecting a DC ground fault current on the basis of a zero-phase current or the method of detecting a DC ground fault on the basis of a change in voltage to ground can hardly detect a DC ground fault at such a point.

Additionally, in the above method using an insulation resistance tester, since a high voltage must be applied across the DC circuit and ground, the operation of the inverter for converting the power must be stopped, resulting in low operation efficiency. In addition, since operation of measuring the insulation resistance is necessary, much labor and time are required.

SUMMARY OF THE INVENTION

It is an object of the present invention to provide a ground fault detection apparatus in a power conversion system, which can detect a DC ground fault without stopping the operation of an inverter even at a point where the DC voltage to ground of a solar battery or the like becomes zero or almost zero.

It is another object of the present invention to provide a ground fault detection method in a power conversion system, which can detect a DC ground fault without stopping the operation of an inverter even at a point where the DC voltage to ground of a solar battery or the like becomes zero or almost zero.

According to the present invention, the above object is achieved by a ground fault detection apparatus in a power conversion system having a DC power supply which has an almost fixed DC voltage to ground and a predetermined stray capacitance to ground and outputs a DC power, and a power converter which converts the DC power output from the DC power supply into an AC power by switching, comprising: a first phase detector which detects a phase of an AC voltage to ground generated in the DC power supply by switching; a second phase detector which detects a phase of an AC ground fault current that flows through the stray capacitance to ground and a ground fault resistance of the DC power supply; and a ground fault determination device which determines a DC ground fault in the DC power supply by comparing a difference between the phases detected by said first and second phase detectors with a predetermined threshold value.

According to the present invention, the above another object is achieved by a ground fault detection method in a power conversion system having a DC power supply which has an almost fixed DC voltage to ground and a predetermined stray capacitance to ground and outputs a DC power, and a power converter which converts the DC power output from the DC power supply into an AC power by switching, comprising: the first phase detection step of detecting a phase of an AC voltage to ground generated in the DC power supply by switching; the second phase detection step of detecting a phase of an AC ground fault current that flows through the stray capacitance to ground and a ground fault resistance of the DC power supply; and the ground fault determination step of determining a DC ground fault in the DC power supply by comparing a difference between the phases detected in the first and second phase detection steps with a predetermined threshold value.

More specifically, according to the present invention, in a power conversion system having a DC power supply which has an almost fixed DC voltage to ground and a predetermined stray capacitance to ground and outputs a DC power, and a power converter which converts the DC power output from the DC power supply into an AC power by switching, the phase of an AC voltage to ground generated in the DC power supply by switching is detected, the phase of an AC ground fault current that flows through the stray capacitance to ground and the ground fault resistance of the DC power supply is detected, and the difference between the two detected phases is compared with a predetermined threshold value, thereby determining a DC ground fault in the DC power supply.

With this arrangement, since the DC ground fault in the DC power supply is determined on the basis of the difference between the phase of the AC voltage to ground generated in the DC power supply by switching of the power converter and the phase of the AC ground fault current that flows through the stray capacitance to ground and the DC ground fault resistance of the DC power supply, the DC ground fault undetectable range is small. In addition, the operation of the power converter need not be stopped upon determining the DC ground fault.

Hence, the ground fault state of the DC power supply can more accurately be detected. Additionally, the operation efficiency of the power conversion system can be increased.

Preferably, the power converter is connected to a commercial power system having one wire grounded.

The first and second phase detectors may detect a phase of a frequency component which is substantially an integral multiple of an output frequency of the power converter, or a phase of a frequency component depending on a variation in active output and/or input of the power converter.

Preferably, the apparatus further comprises notification means for notifying a user that the ground fault determination device determines the DC ground fault.

More preferably, the apparatus further comprises means for recording an operation state of the power conversion system and the difference between the phases detected by the first and second phase detectors.

The DC power supply can be a solar battery.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a graph showing a DC ground fault detection region of the present invention and that of a prior art;

FIGS. 7A to 7C are graphs for explaining the phase relationship between the AC voltage to ground and an AC ground fault current of the present invention;

DETAILED DESCRIPTION OF THE PREFERRED EMBODIMENTS

Preferred embodiments of the present invention will now be described in detail in accordance with the accompanying drawings.

[Principle of Detection]

First, the principle of ground fault detection in a power conversion system according to the present invention will be described.

In the ground fault detection method of the present invention, a DC ground fault of a DC power supply is determined on the basis of the difference between the phase of an AC voltage to ground generated in the DC power supply by switching of a power conversion unit such as an inverter and the phase of an AC ground fault current that flows to ground through a stray capacitance to ground, which is generated by the AC voltage to ground, and the DC ground fault resistance of the DC power supply.

Figure 10:
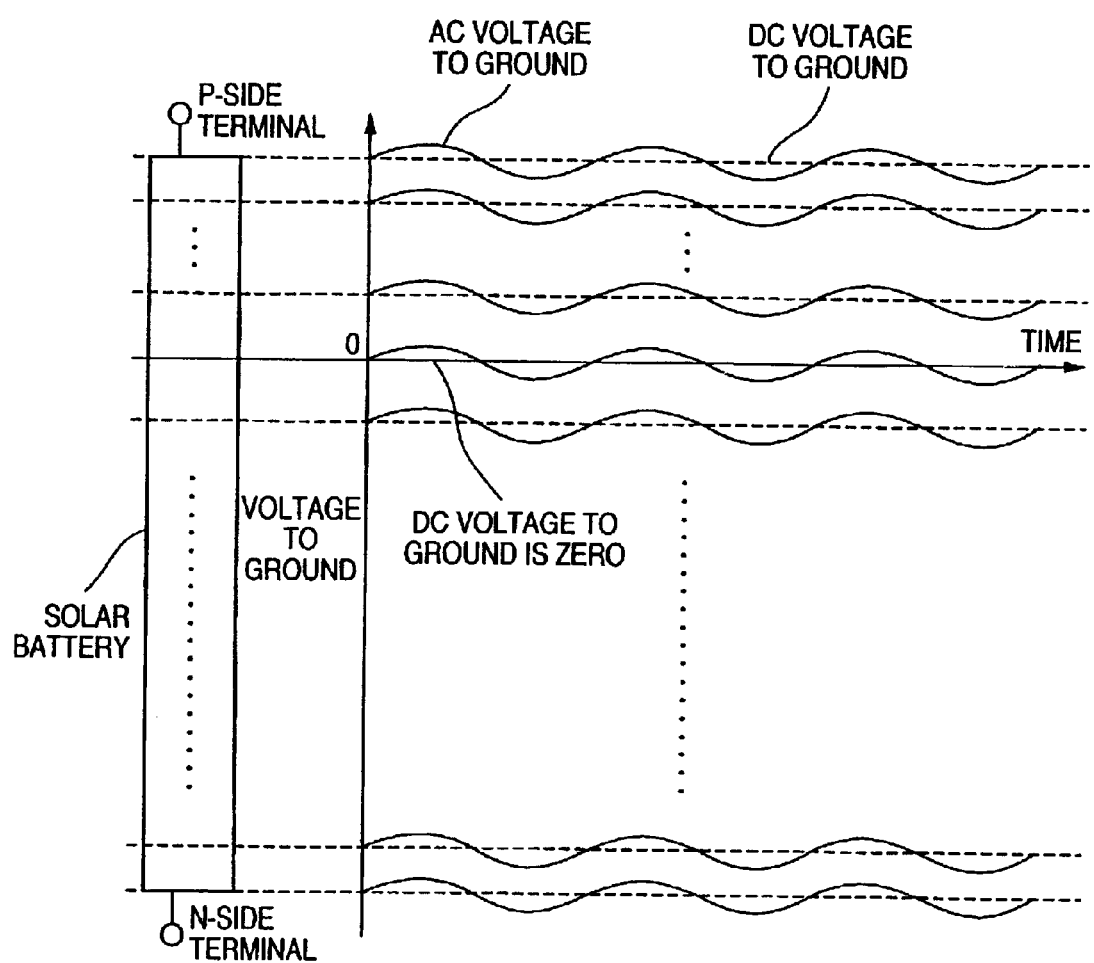
FIG. 10 is a view schematically showing time-rate changes in the DC voltage to ground and AC voltage to ground at various points of a solar battery.

FIG. 10 schematically shows time-rate changes in the DC voltage to ground and AC voltage to ground at various points of a solar battery. As shown in FIG. 10, the AC voltage to ground periodically changes at almost all points. Hence, even at a point where the DC voltage to ground of the solar battery becomes zero or almost zero, the phase of the AC voltage to ground and the phase of an AC ground fault current that flows to ground through a stray capacitance to ground, which is generated by the AC voltage to ground, and the DC ground fault resistance of the DC power supply can be checked without stopping the inverter whereby a DC ground fault can be detected.

Note that the present invention can also be applied to a power conversion system which uses not a solar battery but another DC power supply such as a battery or fuel cell by detecting a change in phase of an AC ground fault current generated by the DC ground fault of the DC power supply.

An embodiment of a ground fault detection apparatus of a power conversion system according to the present invention will be described below in detail with reference to the accompanying drawings. In the following embodiment, a solar power generation system using a solar battery will be exemplified as a power conversion system.

[Schematic Arrangement]

Figure 2:
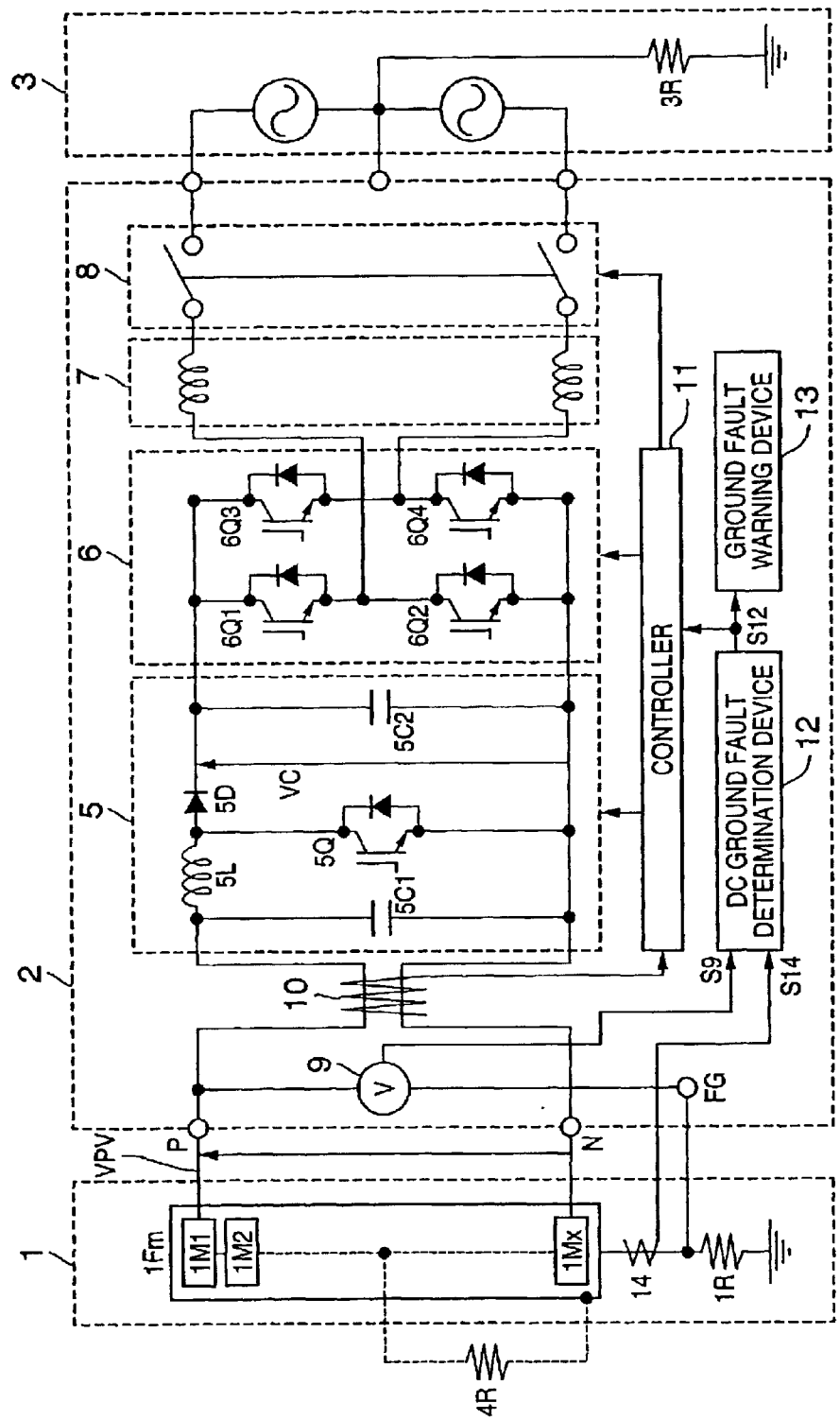
FIG. 2 is a block diagram showing the arrangement of a solar power generation system using an inverter according to the first embodiment of the present invention.

FIG. 2 shows the schematic arrangement of a solar power generation system to which the present invention is applied. The circuit arrangement shown in FIG. 2 employs a system interconnection inverter having uninsulated inputs and outputs as a system interconnection inverter 2 which converts a DC power output from a solar battery 1 into an AC power and outputs the AC power to a commercial power system 3.

The solar battery 1 is formed as a solar battery string by connecting a plurality of solar battery modules 1M1 to 1Mx in series such that an appropriate voltage can be output as the input voltage to the system interconnection inverter 2. The number of solar battery modules may be one if a desired voltage can be obtained. In addition, a plurality of solar battery strings may be connected in parallel to obtain a desired power, although not illustrated. Referring to FIG. 2, reference numeral 1R denotes a ground resistance of a frame 1Fm of the solar battery 1. A current detector 14 is connected between the frame 1Fm and the ground resistance 1R to detect a ground fault current flowing to the ground of the solar battery 1.

Reference numeral 4R denotes a DC ground fault resistance to the frame 1Fm of the solar battery 1. In a normal state, the DC ground fault resistance 4R has a value of 1 MΩ or more. In a ground fault state, the DC ground fault resistance 4R has a small value.

The commercial power system 3 uses a single-phase three-wire electric system having a neutral point grounded. The present invention can be applied to any other system such as a single-phase two-wire system, three-phase three-wire system, or three-phase four-wire system as long as the system has one wire grounded.

The main circuit of the system interconnection inverter (to be referred to as the inverter 2 hereinafter) comprises a converter circuit 5, inverter circuit 6, interconnection reactor 7, and interconnection switch 8.

The converter circuit 5 is a so-called chopper boost circuit formed from a capacitor 5C1 for smoothing a converter input, a boost reactor 5L, a switching element 5Q serving as a chopper of the converter 5, a diode 5D for blocking any flow from the converter output to the input side, and a capacitor 5C2 for smoothing the converter output. The capacitor 5C2 also smoothes the input voltage to the inverter circuit 6 on the output side.

The inverter circuit 6 has a full-bridge circuit structure having switching elements 6Q1 to 6Q4. As the switching elements 5Q and switching elements 6Q1 to 6Q4, IGBTs are used in FIG. 2. However, self-arc-suppressing elements such as MOSFETs may be used.

The interconnection reactor 7 outputs a smooth AC current from the switching voltage output from the inverter circuit 6. The interconnection switch 8 disconnects the inverter 2 from the commercial power system 3 when the inverter 2 is stopping operation.

A voltage detector 9 is a means for detecting the voltage between the frame ground terminal of the inverter 2 connected to the ground of the solar battery 1 and the positive terminal of the DC input portion of the inverter 2. The voltage detector 9 outputs a voltage signal S9 to a DC ground fault determination device 12.

A current detector 10 is the DC ground fault detector of a conventional inverter having uninsulated input and output. The current detector 10 detects the zero-phase current of the DC circuit of the inverter 2 and outputs a ground fault signal S10 at a predetermined threshold value or more.

A controller 11 executes functions that are generally prepared in a system interconnection inverter, i.e., boost control, output waveform control, activation/stop control, MPPT (Maximum Power Point Tracking) control, interconnection protection, inverter protection, and the like. The controller 11 receives the ground fault signal S10 or a DC ground fault warning signal S12 and outputs a gate block signal for the inverter 2 to the inverter circuit 6. The controller 11 simultaneously outputs to the interconnection switch 8 a removal signal which instructs disconnection from the commercial power system 3. In the above MPPT operation, the operation voltage of the solar battery 1 is caused to vary in a predetermined amount at a specific frequency, thereby tracking the maximum point of the solar battery 1, though a detailed operation thereof will be omitted here. Hence, an AC voltage to ground with the above frequency is generated at the input portion of the inverter 2.

The controller 11 can be constituted by digital and analog circuits such as a CPU, DSP, memory, and I/O. Recent CPUs and DSPs have advanced performance and are inexpensive. When these devices are used, various kinds of control can be realized by software. In addition, size and cost reduction and an increase in degree of design can be achieved.

The DC ground fault determination device 12 receives the voltage signal S9 and a current signal S14 and determines a DC ground fault of the solar battery 1. Upon determining a DC ground fault, the DC ground fault determination device 12 outputs the DC ground fault warning signal S12.

A ground fault warning device 13 is a means for generating a warning sound against the DC ground fault of the solar battery 1 upon receiving the DC ground fault warning signal S12. The warning need not always be done by a warning sound. Any other method using light, mechanical vibration, electrical signal, optical signal, or the like can be used as long as it can notify a person or information terminal of the DC ground fault.

The current detector 14 is a means for detecting a ground fault current that flows to the ground of the solar battery 1.

The voltage detector 9 may be connected to the negative side of the input portion of the inverter 2 because the detector only needs to detect the AC voltage to ground of the solar battery 1.

[Detection Method]

Figure 1:
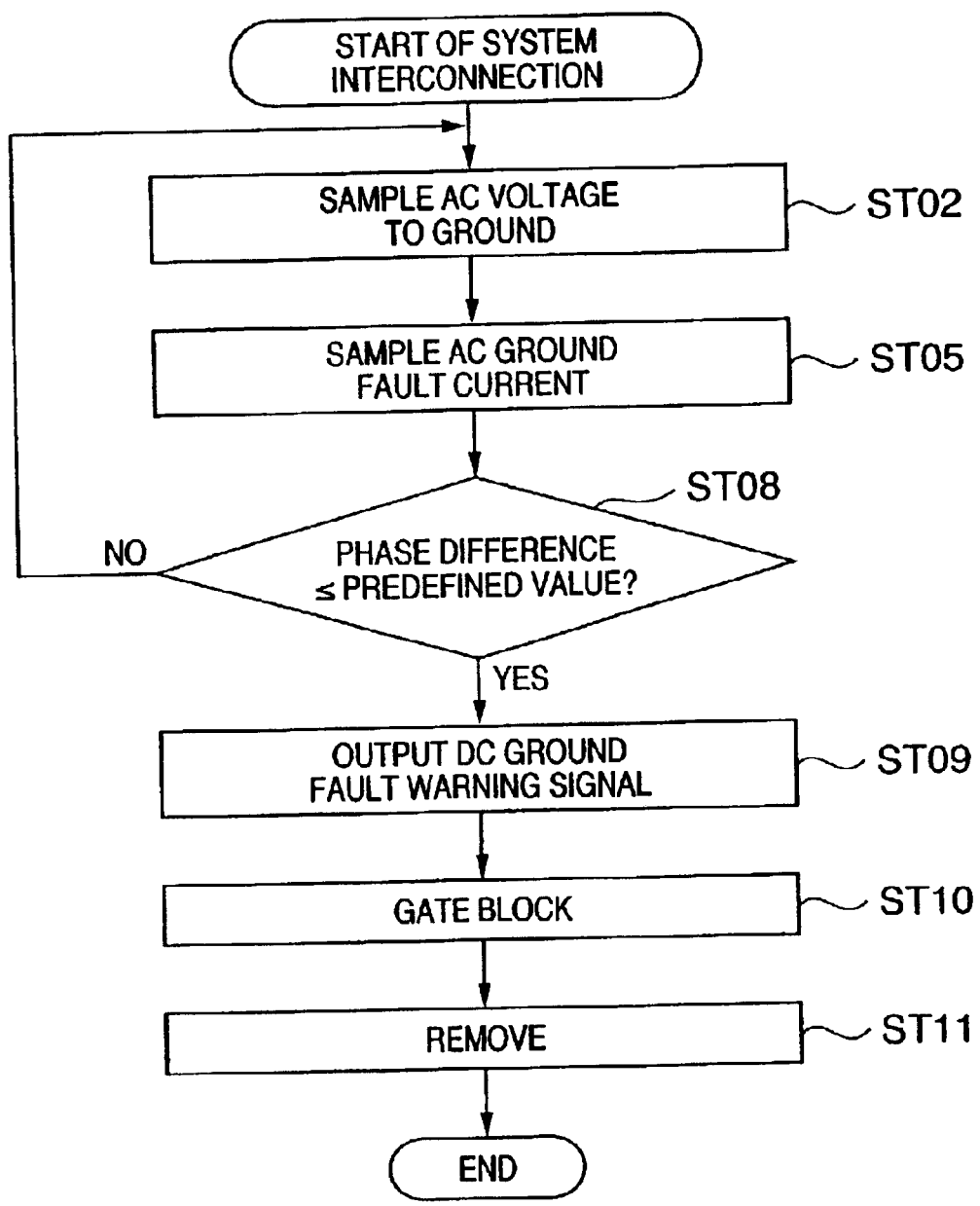
FIG. 1 is a flow chart showing the determination processing of DC ground fault detection according to the present invention.

A DC ground fault detection method in the solar power generation system will be described below with reference to the flow chart shown in FIG. 1.

When the inverter 2 starts interconnection operation to the commercial power system 3, the AC voltage to ground is sampled in step ST02, and an AC ground fault current is sampled in step ST05. In step ST08, it is determined whether the phase difference between the DC voltage to ground and the AC voltage to ground has a predefined value or less. If YES in step ST08, the flow advances to step ST09. If NO in step ST08, the flow returns to step ST02. In step ST09, since a DC ground fault occurs, the DC ground fault warning signal S12 is output. In step ST10, the inverter 2 is gate-blocked. In step ST11, the inverter 2 is removed from the commercial power system 3.

[Mechanism of Ground Fault Detection]

The mechanism of a change in phase above that is used to detect a DC ground fault and the difference between the conventional DC ground fault detection and that of the present invention will be described with reference to FIGS. 2, 3A, 3B, and 4.

Figure 3A:
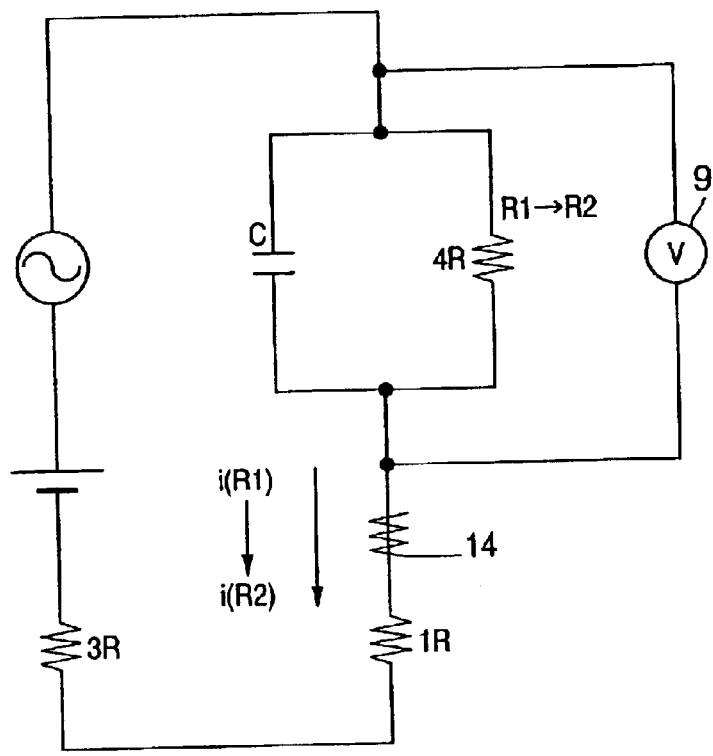
FIG. 3A is a circuit diagram showing a ground fault circuit according to the present invention.
Figure 3B:
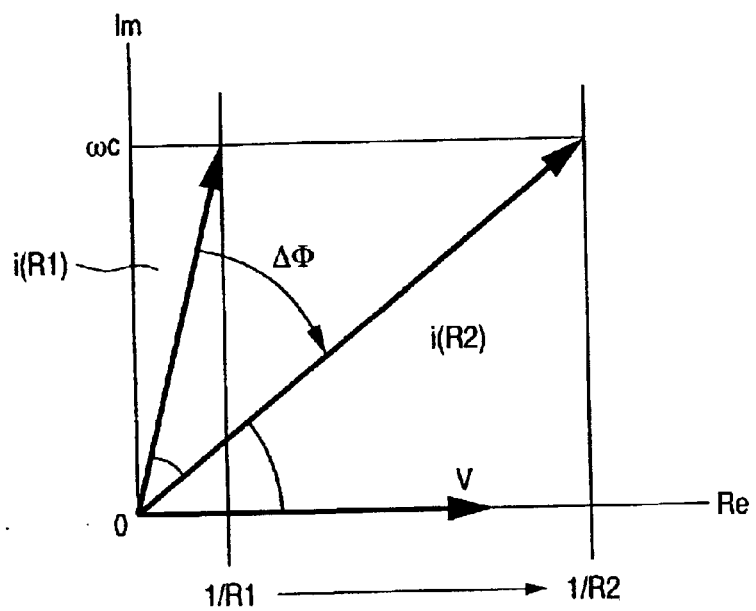
FIG. 3B is a graph showing the phase of an AC ground fault according to the present invention.

FIG. 3A shows the ground fault circuit of the solar battery 1, which is constituted by a stray capacitance to ground C, DC ground fault resistance 4R, and ground resistance 1R of the solar battery 1 and a ground resistance 3R of the commercial power system 3. FIG. 3B shows the phase relationship between the AC ground fault detected by the current detector 14 and the AC voltage to ground detected by the voltage detector 9, in which the ordinate represents the imaginary part, and the abscissa represents the real part. FIG. 4 is a graph schematically showing a DC ground fault detectable region of the prior art and that of the present invention, in which the ordinate represents the DC ground fault resistance, and the abscissa represents the DC voltage to ground.

In the transformerless system interconnection inverter as shown in FIG. 2, the voltage across the capacitor 5C2 is defined as an intermediate voltage VC. Let VPV be the output voltage of the solar battery 1. DC voltages to ground at the DC input portion of the inverter 2 are given by $VA = -VC/2 + VPV$ on the P-side and $VB = -VC/2$ on the N-side.

Figure 9A:
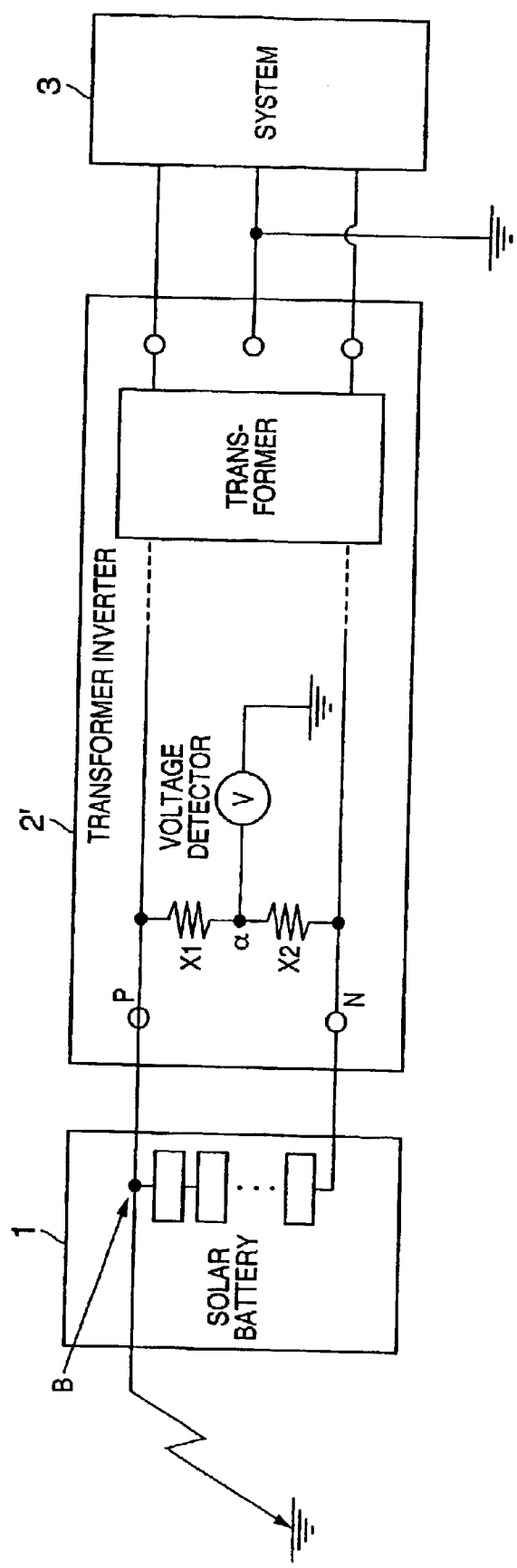
FIG. 9A is a block diagram showing the arrangement of a solar power generation system using a conventional inverter.
Figure 9B:
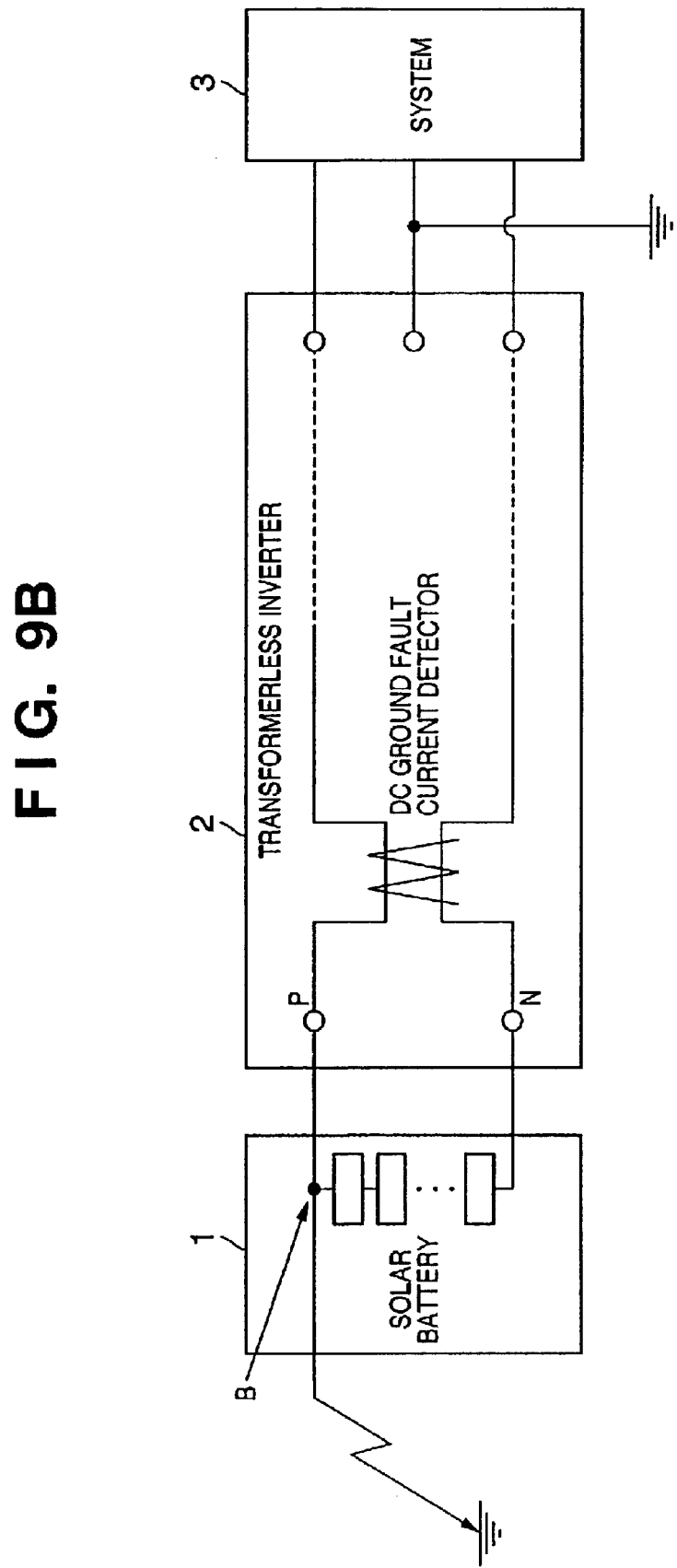
FIG. 9B is a block diagram showing the arrangement of a solar power generation system using another conventional inverter.

If the commercial power system 3 is a single-phase three-wire 200-V commercial system, the intermediate voltage VC is the peak value of the commercial system voltage×2 or more. Assume that VC=350 V and VPV=200 V. In this case, a γ point at which the DC voltage to ground becomes zero is present, as shown in FIG. 4. With the conventional method of detecting a DC ground fault on the basis of a DC ground fault current, a DC ground fault near the γ point cannot be detected even when the DC ground fault resistance 4R is zero. Additionally, in the normal operation mode of the inverter, the output voltage VPV and intermediate voltage VC of the solar battery 1 are almost constant. For this reason, the arrangement shown in FIG. 9B can always detect no DC ground fault near the γ point. Even at any point other than the γ point, a DC ground fault undetectable region widens as the point becomes close to the γ point, as indicated by cross-hatching in FIG. 4.

On the other hand, referring to FIG. 3A, when the DC ground fault resistance 4R of the solar battery 1 before a DC ground fault is sufficiently large (normal state, MΩ order at 4R=R1), an AC ground fault current i(R1) detected by the current detector 14 has a phase lead of 90 deg with respect to an AC voltage to ground V detected by the voltage detector 9, as shown in FIG. 3B.

When the DC ground fault resistance 4R decreases (DC ground fault state, about several ten Ω at 4R=R2), the phase of an AC ground fault current i(R2) changes by only Δφ with respect to i(R1), as shown in FIG. 3B. This phase change Δφ is defined by $$\Delta\phi = \tan^{-1}(\omega C \times 4R) \quad (1)$$

The phase change Δφ is determined independently of the DC voltage to ground.

The present invention can be said to be an excellent DC ground fault detection method because the DC ground fault is detected using the phase change Δφ generated due to the DC ground fault, and therefore, the DC ground fault near the γ point indicated by cross-hatching in FIG. 4 can also be detected.

When a means for recording the operation state and the phase change Δφ, the DC ground fault occurrence state (ground fault resistance and the like) can easily be grasped. In addition, the present invention and the conventional zero-phase current detection can be used together without any technical problem. It is rather preferable for accurate ground fault detection.

[First Embodiment]

An embodiment of a DC ground fault detection apparatus of the present invention in a solar power generation system having the above arrangement will be described below.

In this embodiment, in the arrangement shown in FIG. 2, a commercial power system 3 is a single-phase three-wire 200-V system (frequency: 60 Hz), a ground resistance 3R is 50 Ω, the output power of a solar battery 1 is 2 kW, the output voltage is 200 V, the stray capacitance to ground is 2 μF, a ground resistance 1R is 100 Ω, and the AC voltage to ground is 10 V (effective value). An intermediate voltage VC of an inverter 2 is 350 V (constant).

A DC ground fault determination device 12 that is a characteristic component in the inverter 2 will be described below in detail with reference to FIG. 5. In this embodiment, DC ground fault determination was done for a 120-Hz component (a frequency component twice the commercial frequency 60 Hz) generated by switching of an inverter circuit 6 in the AC voltage to ground and AC ground fault current of the solar battery 1.

Figure 5A:
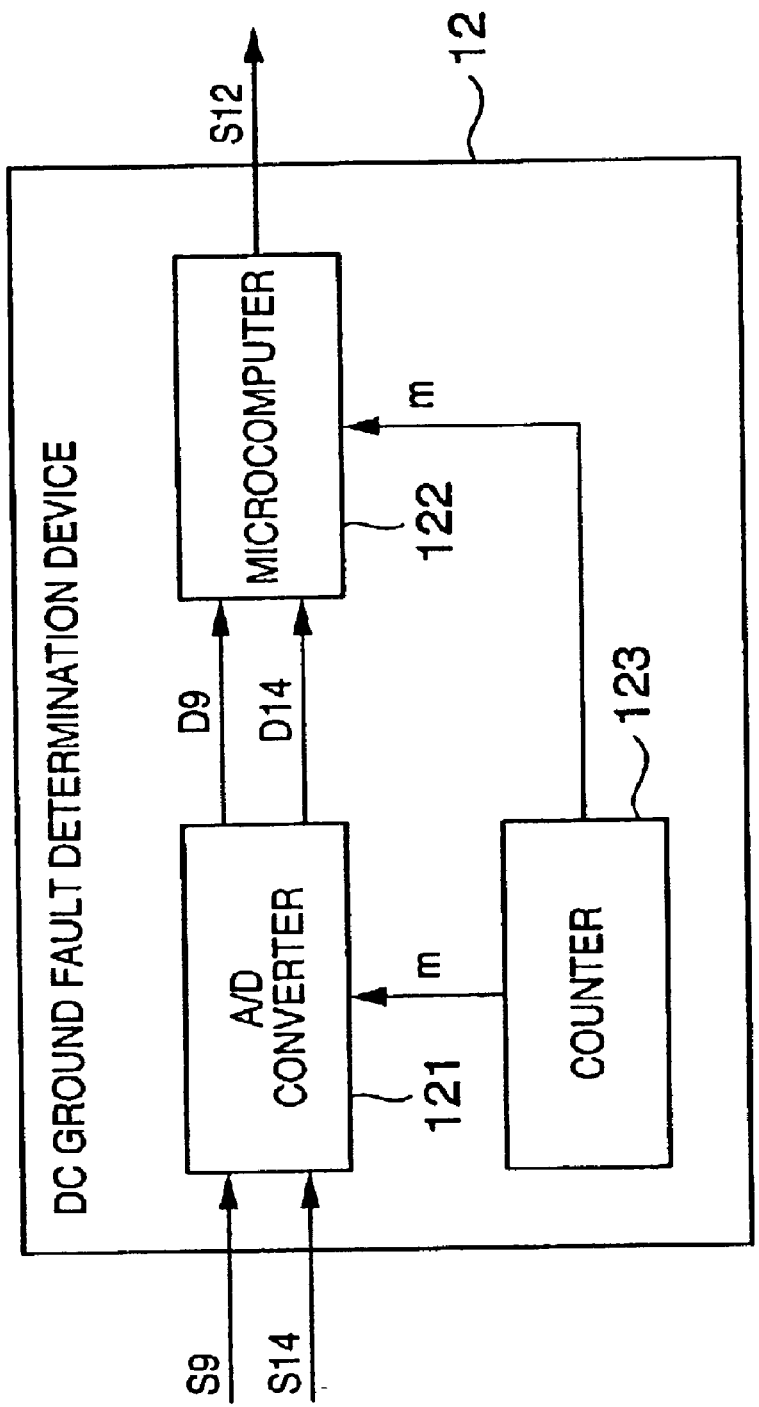
FIG. 5A is a block diagram showing the functional arrangement of a DC ground fault determination means according to the present invention.

FIG. 5A is a functional block diagram showing the arrangement of the DC ground fault determination device 12. The DC ground fault determination device 12 comprises an A/D converter 121, microcomputer 122, and counter 123.

The A/D converter 121 receives a voltage signal S9 and outputs digital data D9. The A/D converter 121 also receives a current signal S14 and outputs digital data D14. The microcomputer 122 determines a DC ground fault of the solar battery 1 on the basis of the received digital data D9 and digital data D14. Upon determining a DC ground fault, the microcomputer 122 outputs a DC ground fault signal S12. The counter 123 starts counting from m=1 after the start of operation of the inverter 2. The A/D converter 121 and microcomputer 122 operate in synchronism with the period of the count m, and the sampling frequency of the microcomputer 122 also has the same period as the count m, although a detailed description thereof will be omitted here.

Figure 5B:
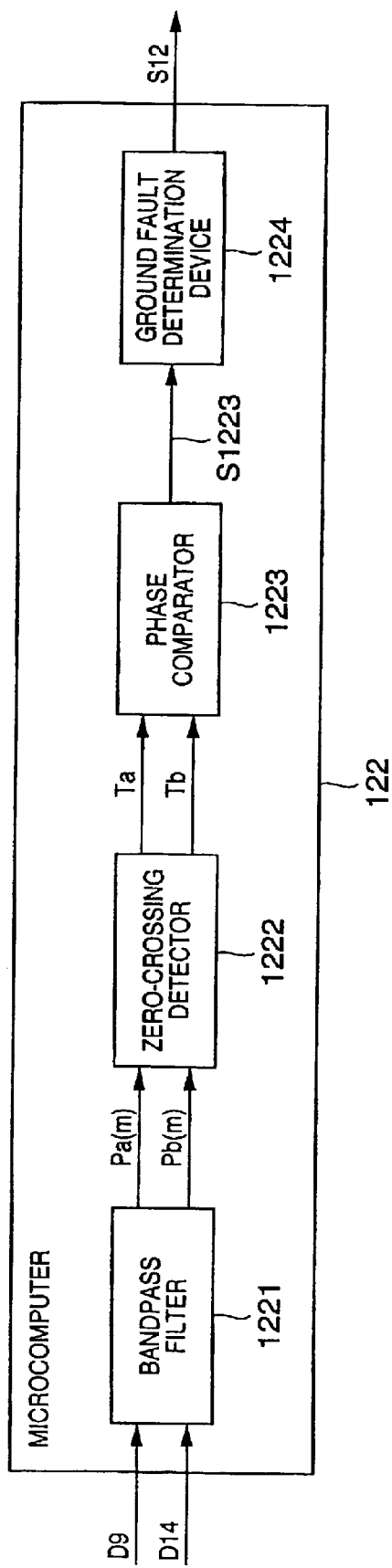
FIG. 5B is a block diagram showing the functional arrangement of a microcomputer incorporated in the DC ground fault determination means shown in FIG. 5A.

FIG. 5B is a functional block diagram showing the arrangement of the microcomputer 122 incorporated in the DC ground fault determination device 12. The microcomputer 122 comprises a bandpass filter 1221, zero-crossing detector 1222, phase comparator 1223, and ground fault determination device 1224.

The bandpass filter 1221 outputs, from the received digital data D9, the extraction result of the 120-Hz component (to be referred to as an AC voltage to ground hereinafter) of the AC voltage to ground, i.e., digital data Pa(m) at the count m. The bandpass filter 1221 also outputs, from the received digital data D14, the extraction result of the 120-Hz component (to be referred to as an AC ground fault current hereinafter) of the AC voltage to ground, i.e., digital data Pb(m) of the AC ground fault current at the count m. The zero-crossing detector 1222 detects a positive-to-negative zero-crossing point of the digital data Pa(m) (to be described later with reference to FIG. 7A) and outputs the count signal m at the time of detection as a positive-to-negative zero-crossing signal Ta. The zero-crossing detector 1222 also detects a zero-crossing point of the digital data Pb(m) in FIGS. 7B and 7C and outputs the count signal m at the time of detection as a zero-crossing signal Tb.

The phase comparator 1223 outputs a difference ΔT between the positive-to-negative zero-crossing signal Ta and the zero-crossing signal Tb (this difference will be referred to as a zero-crossing difference ΔT hereinafter, ΔT=Tb−Ta) as a phase difference signal S1223. When the phase difference signal S1223 has a DC ground fault determination reference value ΔTX or more, as will be described later, the ground fault determination device 1224 outputs the DC ground fault warning signal S12.

Details of the DC ground fault determination method of this embodiment will be described below with reference to FIGS. 2, 6, and 7A to 7C.

Figure 6:
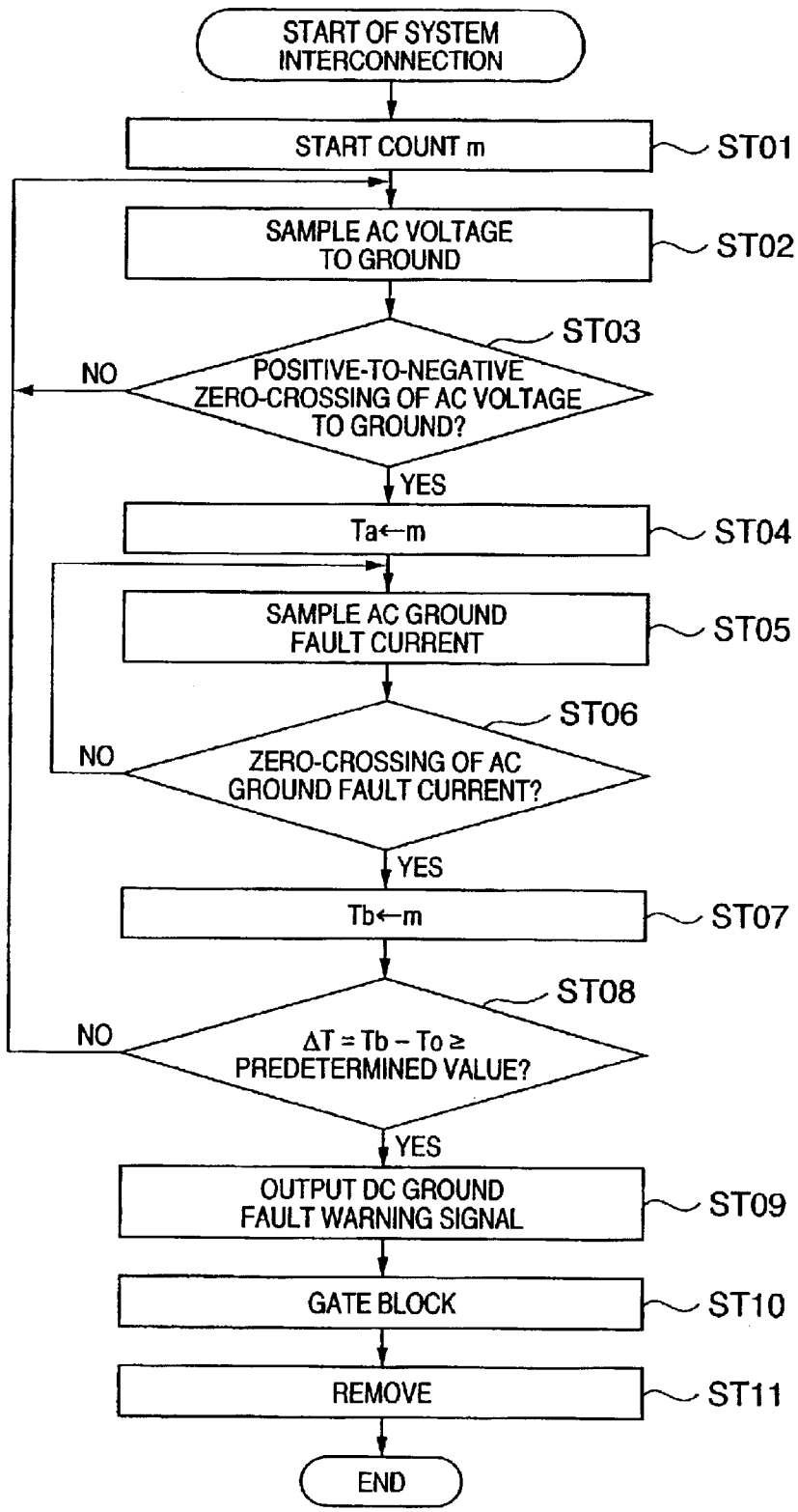
FIG. 6 is a flow chart showing the determination processing of DC ground fault detection according to the first embodiment of the present invention.

FIG. 6 is a flow chart showing the DC ground fault determination method of this embodiment. When the inverter 2 starts interconnection operation to the commercial power system 3, the counter 123 starts the count m in step ST01.

In steps ST02 to ST04, the count m when the AC voltage to ground has reached the positive-to-negative zero-crossing point (to be described later with reference to FIGS. 7A to 7C) is substituted into the positive-to-negative zero-crossing signal Ta. More specifically, first in step ST02, the AC voltage to ground is sampled. If it is determined in step ST03 that the AC voltage to ground has reached the positive-to-negative zero-crossing point, the flow advances to step ST04. If NO in step ST03, the flow returns to step ST02. Finally in step ST04, the count m when the positive-to-negative zero-crossing point is detected is substituted into the positive-to-negative zero-crossing signal Ta.

In steps ST05 to ST07, the count m when the AC ground fault current has reached the zero-crossing point is substituted into the zero-crossing signal Tb. More specifically, first in step ST05, the AC ground fault current is sampled. If it is determined in step ST06 that the AC ground fault current has reached the zero-crossing point, the flow advances to step ST07. If NO in step ST06, the flow returns to step ST05. Finally in step ST07, the count m when the zero-crossing point is detected is substituted into the zero-crossing signal Tb.

In steps ST08 to ST11, DC ground fault determination is done, and after the ground fault determination, the operation of the inverter is stopped. More specifically, first, if it is determined in step ST08 that the zero-crossing difference ΔT has the DC ground fault determination reference value ΔTX or more, the flow advances to step ST09. If NO in step ST08, the flow returns to step ST02. In step ST09, the DC ground fault warning signal S12 is output. In step ST10, the inverter 2 is gate-blocked. Finally in step ST11, the inverter 2 is removed from the system 3 by the interconnection switch 8.

FIG. 7A shows a time-rate change in value (a) of the digital data Pa(m) of the AC voltage to ground in this embodiment, which is detected by the voltage detector 9. FIGS. 7B and 7C are graphs showing time-rate changes in value of the digital data Pb(m) of the AC ground fault current detected by the current detector 14. FIG. 7B shows a change in value of the digital data Pb(m) when the solar battery 1 is in the normal state (DC ground fault resistance 4R is sufficiently large), and FIG. 7C shows a change in value of the digital data Pb(m) in the DC ground fault state (the DC ground fault resistance 4R is sufficiently small).

In this embodiment, the interval between the point Ta in FIG. 7A and the point Tb in FIG. 7B or 7C is calculated as the zero-crossing difference ΔT. As shown in the example of FIG. 7C, if the zero-crossing difference ΔT has the DC ground fault determination reference value ΔTX or more, it is determined that a DC ground fault has occurred. Accordingly, the inverter 2 is gate-blocked and removed from the commercial power system 3.

In this embodiment, the frequency of the count m was set to 24 kHz much higher than the frequency of the component to be detected (120 Hz). This also applies to the sampling frequency of the A/D converter 121. Hence, one count of the count m corresponds to 1.8 deg (=360 deg×120 Hz/24 kHz) of this component. When the solar battery 1 is in the normal state, as shown in FIG. 7B, the value of the zero-crossing difference ΔT is 90 deg/1.8 deg=50. In this embodiment, the DC ground fault determination reference value ΔTX was set to 56 such that a DC ground fault was determined when the phase change Δφ changed from the above state by 10 deg or more, i.e., when the zero-crossing difference ΔT was equal to or more than (50 deg+10 deg)/1.8 deg≈55.5.

The phase change Δφ at which the DC ground fault is determined is set to 10 deg, as described above, because the body resistance in the dry state is about 2 kΩ under Japan Electric Association Guide (JEAG) 8101 "guide for ground fault protection in low-voltage lines", and a DC ground fault is determined at 4 kΩ or less with a margin of 2 kΩ. When the DC ground fault resistance 4R is 4 kΩ, Δφ=9.41 deg from equation (1). Hence, the phase change Δφ is set to 10 deg.

When a DC ground fault of 4 kΩ or less has occurred in the solar battery 1, the inverter 2 can quickly detect the DC ground fault independently of its position.

However, the DC ground fault determination reference value ΔTX is not limited to the above value and is preferably set to a value with which any insulation fault in a module or electrical shock in a human body or the like can be detected without any error. In addition, when a DC ground fault is determined after a DC ground fault has continuously been determined a plurality of number of times rather than once, the determination accuracy increases. The current detector 10 used in this embodiment outputs the ground fault signal S10 at a zero-phase current of 75 mA or more.

Experiments that were conducted to examine the operation of this embodiment will be described below with reference to FIGS. 2 to 4.

First, without connecting the DC ground fault determination device 12, a DC ground fault was caused at the γ point shown in FIG. 4, where the DC ground fault was supposed to be most hardly to detect, by setting the DC ground fault resistance (4R) to 100 Ω. As a result, no DC ground fault was detected by the current detector 10. The DC ground fault was not detected, and the inverter 2 continued operation.

Next, the DC ground fault determination device 12 was connected, and a DC ground fault was caused under the same conditions as described above. As a result, the zero-crossing difference ΔT that was 50 before occurrence of the DC ground fault exceeded the DC ground fault determination reference value ΔTX (=62) and became 96 after the DC ground fault. The ground fault warning device 13 generated a warning sound, and the inverter 2 stopped operation. The inverter 2 was removed from the commercial power system 3.

From the above examination results, the effectiveness of the present invention was confirmed.

The frequency for monitoring the phase change Δφ may be an almost integral multiple of a variation in active input or output of the MPPT of the inverter 2, the independent operation detecting function of the system interconnection inverter, or the like.

As described above, according to this embodiment, a DC ground fault in the DC power supply is determined on the basis of the difference between the phase of the AC voltage to ground generated in the DC power supply due to switching of the inverter which converts a DC power from the DC power supply having a fixed DC voltage to ground and a stray capacitance to ground into an AC power and outputs the AC power to the load and the phase of the AC ground fault current that flows through the stray capacitance to ground and the DC ground fault resistance of the DC power supply due to the AC voltage to ground. Hence, a DC ground fault undetectable region is small. In addition, the operation of the inverter need not be stopped in determining a DC ground fault.

Furthermore, when the frequencies of the AC voltage to ground and AC ground fault current whose phases are to be compared are set to an almost integral multiple of the frequency of the output AC power, no new AC voltage to ground need be generated. Hence, the apparatus can be made compact and inexpensive.

[Second Embodiment]

A DC ground fault detection apparatus according to the second embodiment of the present invention will be described below. A description of the same parts as in the first embodiment will be omitted, and characteristic parts of the second embodiment will mainly be described.

In this embodiment, of the AC voltage to ground and AC ground fault current of a solar battery 1, a 0.5-Hz component generated due to the MPPT of an inverter 2 is used to determine a DC ground fault.

To do this, in this embodiment, a bandpass filter 1221 extracts the 0.5-Hz component from the AC voltage to ground and AC ground fault current. The difference from the first embodiment by this modification will be described below in detail.

In the first embodiment, the frequency of a count m is 24 kHz. One count corresponds to 1.8 deg of the 120-Hz component. In the second embodiment, to obtain the same phase comparison accuracy as in the first embodiment, the frequency of the count m is set to 100 Hz. Accordingly, one count of the count m corresponds to 1.8 deg, as in the first embodiment.

In addition, as is apparent from equation (1), since the frequency for monitoring the component whose phase is much lower in the second embodiment than in the first embodiment, a phase change Δφ can be obtained even by a change in high DC ground fault resistance 4R. That is, the sensitivity against a decrease in DC ground fault resistance 4R of the solar battery 1 is high.

In this embodiment, the value of the DC ground fault resistance 4R at which a DC ground fault should be determined is set to 1 MΩ or less. From equation (1), the phase change Δϕ at which a DC ground fault should be determined is 9.04 deg. That is, when a zero-crossing difference ΔT is 55.04=50+9.04/1.8 or more, a DC ground fault is determined. Hence, a DC ground fault determination reference value ΔTX is set to 56. In this embodiment, additionally, the DC ground fault resistance 4R when a DC ground fault has occurred is set to 500 kΩ.

Experiments that were conducted to examine the operation of this embodiment will be described below.

First, without connecting a DC ground fault determination device 12, a DC ground fault was caused at a γ point shown in FIG. 4, where the DC ground fault was supposed to be most hardly to detect. As a result, no DC ground fault was detected by a current detector 10. The DC ground fault was not detected, and the inverter 2 continued operation.

Next, the DC ground fault determination device 12 was connected, and a DC ground fault was caused under the same conditions as described above. As a result, the zero-crossing difference ΔT that was 50 before occurrence of the DC ground fault exceeded the DC ground fault determination reference value ΔTX (=56) and became 60 after the DC ground fault. A ground fault warning device 13 generated a warning sound, and the inverter 2 stopped operation. The inverter 2 was removed from a commercial power system 3.

From the above examination results, the effectiveness of the present invention was confirmed.

As described above, even when a DC ground fault is detected on the basis of an AC-voltage-to-ground component or AC ground fault current component other than an integral multiple of the output frequency of the inverter, the same effect as described above can be obtained.

As described above, according to this embodiment, in addition to the effect of the first embodiment, when the frequencies of the AC voltage to ground and AC ground fault current at which the phases are to be compared are set to a frequency due to a variation in active output and/or input of the power conversion apparatus, a component having a higher detection accuracy against a DC ground fault can be selected.

[Third Embodiment]

A DC ground fault detection apparatus according to the third embodiment of the present invention will be described below. A description of the same parts as in the first embodiment will be omitted, and characteristic parts of the third embodiment will mainly be described.

Figure 8:
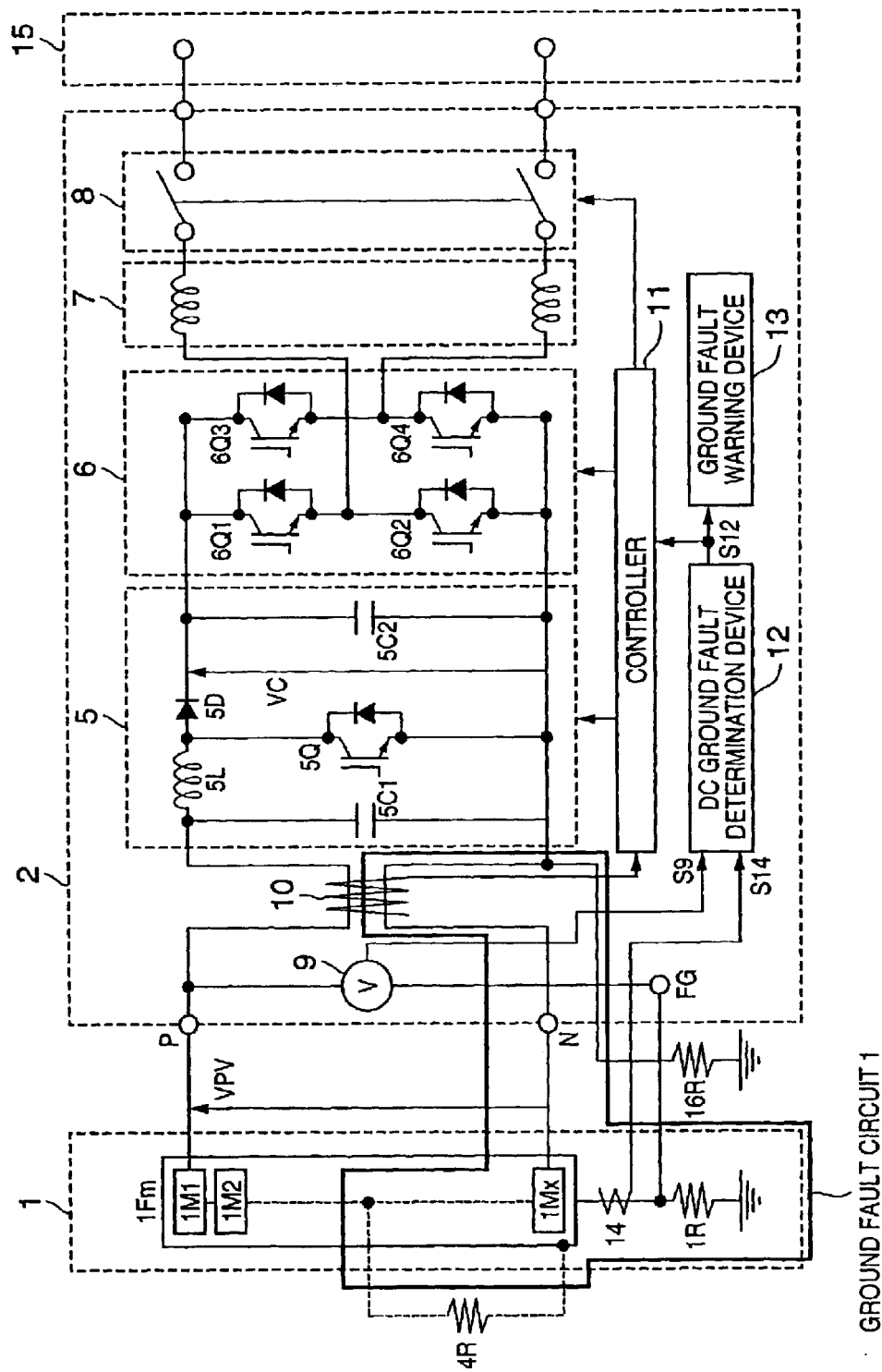
FIG. 8 is a block diagram showing the arrangement of a solar power generation system using an inverter according to the third embodiment of the present invention.

In this embodiment, as shown in FIG. 8, the output power of an inverter 2 is input not to a commercial power system 3 but to an ungrounded load 15. In addition, an output N side of a solar battery 1 is grounded by a ground resistance R16 (100 Ω). Except these two points, the arrangement is the same as in the first embodiment, including conditions in examination experiments.

Experiments that were conducted to examine the operation of this embodiment will be described below with reference to FIGS. 8 and 4.

First, without connecting a DC ground fault determination device 12, a DC ground fault was caused at a γ point shown in FIG. 4, where the DC ground fault was supposed to be most hardly to detect. As a result, no DC ground fault was detected. A current detector 10 cannot detect this DC ground fault, and the inverter 2 continued operation.

Next, the DC ground fault determination device 12 was connected, and a DC ground fault was caused under the same conditions as described above. As a result, the zero-crossing difference ΔT that was 50 before occurrence of the DC ground fault exceeded a DC ground fault determination reference value ΔTX (=62) and became 95 after the DC ground fault. A ground fault warning device 13 generated a warning sound, and the inverter 2 stopped operation. The inverter 2 was removed from a commercial power system 3.

From the above examination results, the DC ground fault determination device of the present invention was confirmed to effectively act even in an independent power conversion system that is not connected to any commercial power system. That is, the present invention can be applied to any power conversion system in which the DC voltage to ground on the DC side is almost in a fixed state (however, a small voltage variation due to switching operation is present) and a specific stray capacitance to ground is arranged on the D power supply side.

As described above, according to this embodiment, in addition to the effects of the first and second embodiments, when a load whose DC voltage to ground was fixed is used as a system whose one wire is grounded, the present invention can widely be applied to various system interconnection systems.

[Other Embodiments]

The present invention can be applied to a system comprising a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments being realized by executing the program codes which are read by a computer, the present invention also includes a case where an OS (operating system) or the like working on the computer performs parts or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

If the present invention is realized as a storage medium, program codes corresponding to the above mentioned flowcharts (FIG. 1 and/or FIG. 6) are to be stored in the storage medium.

As is apparent, many different embodiments of the present invention can be made without departing from the spirit and scope thereof, so it is to be understood that the invention is not limited to the specific embodiments thereof except as defined in the appended claims.

What is claimed is:

1. A ground fault detection apparatus in a power conversion system having a DC power supply which has an almost fixed DC voltage to ground and a predetermined stray capacitance to ground and outputs a DC power, and a power converter which converts the DC power output from the DC power supply into an AC power by switching, comprising:

a first phase detector which detects a phase of an AC voltage to ground generated in the DC power supply by switching;

a second phase detector which detects a phase of an AC ground fault current that flows through the stray capacitance to ground and a ground fault resistance of the DC power supply; and a ground fault determination device which determines a DC ground fault in the DC power supply by comparing a difference between the phases detected by said first and second phase detectors with a predetermined threshold value.

2. The apparatus according to claim 1, wherein the power converter is connected to a commercial power system having one wire grounded.

3. The apparatus according to claim 1, wherein said first and second phase detectors detect a phase of a frequency component which is substantially an integral multiple of an output frequency of the power converter.

4. The apparatus according to claim 1, wherein said first and second phase detectors detect a phase of a frequency component depending on a variation in active output and/or input of the power converter.

5. The apparatus according to claim 1, further comprising notification means for notifying a user that said ground fault determination device determines the DC ground fault.

6. The apparatus according to claim 1, further comprising means for recording an operation state of the power conversion system and the difference between the phases detected by said first and second phase detectors.

7. The apparatus according to claim 1, wherein the DC power supply is a solar battery.

8. A ground fault detection method in a power conversion system having a DC power supply which has an almost fixed DC voltage to ground and a predetermined stray capacitance to ground and outputs a DC power, and a power converter which converts the DC power output from the DC power supply into an AC power by switching, comprising:

the first phase detection step of detecting a phase of an AC voltage to ground generated in the DC power supply by switching;

the second phase detection step of detecting a phase of an AC ground fault current that flows through the stray capacitance to ground and a ground fault resistance of the DC power supply; and the ground fault determination step of determining a DC ground fault in the DC power supply by comparing a difference between the phases detected in the first and second phase detection steps with a predetermined threshold value.

9. The method according to claim 8, wherein in the first and second phase detection steps, a phase of a frequency component which is substantially an integral multiple of an output frequency of the power converter is detected.

10. The method according to claim 8, wherein in the first and second phase detection steps, a phase of a frequency component depending on a variation in active output and/or input of the power converter is detected.

11. The method according to claim 8, further comprising the notification step of notifying a user that the DC ground fault is determined in the ground fault determination step.

12. The method according to claim 8, further comprising the step of recording an operation state of the power conversion system and the difference between the phases detected in the first and second phase detection steps.

13. A computer program for causing a computer to execute a ground fault detection method in a power conversion system having a DC power supply which has an almost fixed DC voltage to ground and a predetermined stray capacitance to ground and outputs a DC power, and a power converter which converts the DC power output from the DC power supply into an AC power by switching, comprising:

program codes corresponding to the first phase detection step of detecting a phase of an AC voltage to ground generated in the DC power supply by switching;

the second phase detection step of detecting a phase of an AC ground fault current that flows through the stray capacitance to ground and a ground fault resistance of the DC power supply; and the ground fault determination step of determining a DC ground fault in the DC power supply by comparing a difference between the phases detected in the first and second phase detection steps with a predetermined threshold value.

14. A storage medium which stores a computer program for causing a computer to execute a ground fault detection method in a power conversion system having a DC power supply which has an almost fixed DC voltage to ground and a predetermined stray capacitance to ground and outputs a DC power, and a power converter which converts the DC power output from the DC power supply into an AC power by switching, the storage medium storing program codes corresponding to the first phase detection step of detecting a phase of an AC voltage to ground generated in the DC power supply by switching;

the second phase detection step of detecting a phase of an AC ground fault current that flows through the stray capacitance to ground and a ground fault resistance of the DC power supply; and the ground fault determination step of determining a DC ground fault in the DC power supply by comparing a difference between the phases detected in the first and second phase detection steps with a predetermined threshold value.

* * * * *

UNITED STATES PATENT AND TRADEMARK OFFICE
CERTIFICATE OF CORRECTION

| | |
|---|---|
| PATENT NO. | : 6,927,955 B2 |
| APPLICATION NO. | : 10/252569 |
| DATED | : August 9, 2005 |
| INVENTOR(S) | : Suzui et al. |

It is certified that error appears in the above-identified patent and that said Letters Patent is hereby corrected as shown below:

COLUMN 9:
Line 67, "hardly" should read -- hard --.

COLUMN 11:
Line 13, "hardly" should read -- hard --;
Line 48, "Except" should read -- Except for --; and
Line 56, "hardly" should read -- hard --.

Signed and Sealed this

Nineteenth Day of September, 2006

JON W. DUDAS
*Director of the United States Patent and Trademark Office*